July 19, 1932. G. F. KÄPERNICK 1,868,209
MODEL FITTING HEAD FOR OPTICIANS
Filed Feb. 7, 1931

Inventor,
Georg F. Käpernick
By Henry Orth Jr. atty.

Patented July 19, 1932

1,868,209

UNITED STATES PATENT OFFICE

GEORG FRIEDRICH KÄPERNICK, OF FRANKFORT-ON-THE-MAIN, GERMANY

MODEL FITTING HEAD FOR OPTICIANS

Application filed February 7, 1931, Serial No. 514,274, and in Germany February 13, 1930.

In order to teach and carry out the fitting of spectacle and pince-nez frames use is generally made of plaster heads, on which the optician carries out the necessary bending and fitting operations. Such plaster heads are, however, not very suitable for the purpose, because the nose becomes damaged and worn out by the frequent taking on and off of spectacle and pince-nez frames and a large number of differently shaped model heads is always required for the various shapes of faces which have to be fitted.

Even when, in order to overcome these disadvantages, the fittings and adjustments are carried out on living models, these models are seldom able to keep still and to maintain their eyes in the same position, since the adjustments at any one fitting usually take a considerable time, particularly in the case of beginners. Further it frequently happens, for example in a school, that the instructor when checking the student's work no longer meets with the same conditions as those encountered by the student.

The model fitting head for opticians according to this invention overcomes the above disadvantages. It is constructed from durable material, such as wood, hard rubber or the like, and is therefore only subject to wear to a very slight extent. It can be readily adjusted to the most varying shapes corresponding to the human face or head, by reason of the fact that the positions of the eyes, nose and ears and the width of the head can be varied. The eyes can be individually brought near the nose, the temples, the eye brows and the cheeks, so that in this way the pupil of one eye can take up the most extreme positions in respect of the nose and the other eye. It is further possible also to move the ears forwards, or backwards, or up and down, and to alter the width of the head by means of an adjusting device. The eyes, nose and ears are provided at their surfaces of application to the head proper with pins, with the aid of which they are introduced into holes or slots in the head designated by numerals and letters, so that, even after temporary interruptions of the hours of study or temporarily interrupted fitting operations, when once the type of face or head has been indicated by numerals, this type can always be reproduced until the student or the optician carrying out the fitting, as well as having adjusted the glasses at any desired slant, has fitted the geometrical and optical centres of the glasses in front of the centres of the pupils in the manner required for a correct aid to vision.

By means of special rubber coverings over the nose or by forming the nose of rubber it is further possible so to fit finger pince-nez and other pince-nez frames on the model head that the requirements from an optically technical standpoint are completely met.

The width of the head can be adjusted owing to the fact that the side portions of the head are attached to the face in wing-like manner by means of hinges running perpendicularly from the temples down the cheeks and the side portions can be laterally adjusted at the back of the head by means of adjusting screws.

Corresponding with the varying shapes of the human head, the model head according to the invention is provided with a series of differently shaped glass eyes and wood or rubber noses and ears as well as with metal or glass eyes, the pupils of which are provided with a cross to enable the glasses to be adjusted to the centres of the eyes.

The accompanying drawing illustrates an embodiment of the invention wherein.

Figure 5:

Figure 5 in contradistinction to these specially illustrated models is a front elevation of a flat representative of an eye, which may with advantage be constructed of sheet metal.

Figure 6:
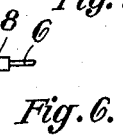

Figure 6 is a side elevation of the same, and

Figure 7:
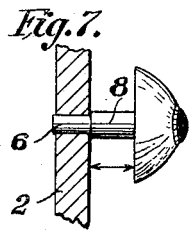

Fig. 7 is a detail view, partly in section, of an eye mounted on a pin inserted in an opening in the face.

Figure 1:
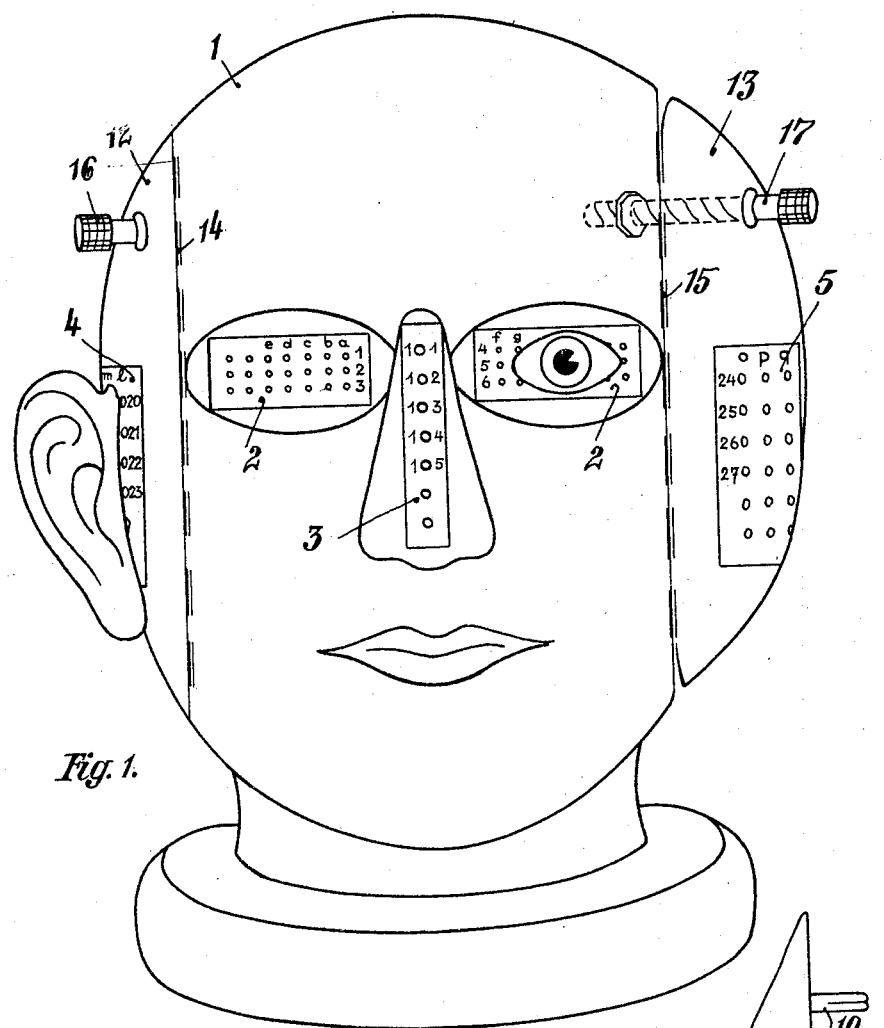
Figure 1 is a front elevation of the model head.
Figure 3:
Figures 3 and 4 are diagrams of an ear and an eye.
Figure 4:
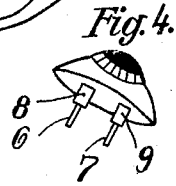
Figure 2:
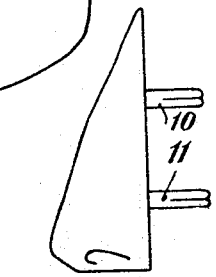
Figure 2 is a side elevation of a model nose.

The metallic element 2 is let into each of the eye spaces of the model head 1 and similar elements 3, 4 and 5 inserted for the nose and the two ears. As shown in the drawing these individual elements are provided with holes, which are designated by numerals and letters. The rear sides of the eye are provided as shown in Figures 4 and 6 with one or more pins 6 and 7 to be inserted in the holes of element 2 and of a size to fit snugly therein. These pins are constructed with enlargements at 8 and 9 larger than the holes in element 2, and forming abutments to engage the outer surfaces of element 2, so as to enable the eye to be held at the proper distance from the metallic element 2 to position the eye pupil in the proper position relative to the other features of the face. The nose and ears are adjustably attached to the head by means of the split pins 10 and 11 (Figure 2). The cheek sections 12 and 13 are attached by means of hinges 14 and 15 to the face of the head. By means of adjusting screws 16 and 17 the cheeks can be moved in relation to the head in order to obtain different widths of the head.

Figures 5 and 6 illustrate a model eye made of sheet metal, which is plane in construction. The pupil 18 of the same is provided with a cross 19. The student is provided with an eye of this kind inserted in the model head, so that he can learn with the aid of the cross 19 how to adjust glasses on the centre of the eye.

The arrangement of the holes in the base plates 2 and 3 or 4 and 5 is such that the eyes, nose and ears to be inserted can be adjusted at varying height and width in relation to one another. In this way any desired type of head formation can be clearly set up with the aid of the attached numerals and letters.

What I claim is:

1. A model fitting head for teaching and carrying out the fitting of spectacle and pince-nez frames, comprising in combination, a central portion of the head, an eye and a nose associated with said central portion, a side portion hinged to said central portion and an ear adjustable in position on said side portion.

2. A model fitting head for teaching and carrying out the fitting of spectacle and pince-nez frames, comprising in combination a plurality of members constituting a central portion of the head, an eye and a nose associated with said central portion, a side portion hinged to said central portion and an ear adjustable in position on said side portion.

3. A model fitting head for teaching and carrying out the fitting of the spectacle and pince-nez frames, comprising in combination, a central portion of the head, an eye and a nose associated with said central portion, a side portion hinged to said central portion, an ear adjustable in position on said side portion, separate elements let into said head and provided with distinctively marked apertures, and members on said eye, nose and ear adapted for insertion into said distinctively marked apertures.

4. A model fitting head for teaching and carrying out the fitting of spectacle and pince-nez frames, comprising in combination a plurality of members constituting a central portion of the head an eye and a nose associated with said central portion, a side portion hinged to said central portion, an ear adjustable in position on said side portion, separate elements let into said head and provided with distinctively marked apertures, and members on said eye, nose and ear adapted for insertion into said distinctively marked apertures.

5. A model fitting head for teaching and carrying out the fitting of spectacle and pince-nez frames, comprising in combination a central portion of the head, an eye associated with said central portion, a side portion hinged to said central portion, a separate element let into said central portion and provided with distinctively marked apertures, members carrying said eye and adapted for insertion into said distinctively marked apertures and formed with means for spacing said eye a fixed distance from the separate element.

6. A model fitting head for teaching and carrying out the fitting of spectacle and pince-nez frames, comprising in combination a central portion of the head a flat representation of an eye the centre of the pupil of which is distinguished by a cross for adjusting the centre of the eye associated with said central portion, a side portion hinged to said central portion and an ear adjustable in position on said side portion.

7. A model fitting head for teaching and carrying out the fitting of spectacle and pince-nez frames, comprising in combination a central portion of the head, a flat representation of an eye the centre of the pupil of which is distinguished by a cross for adjusting the centre of the eye associated with said central portion, a side portion hinged to said central portion, an ear adjustable in position on said side portion, separate metallic elements let into said head and provided with distinctively marked apertures and members on said eye and ear adapted for insertion into said distinctively marked apertures.

8. A model fitting head for teaching and carrying out the fitting of spectacle and pince-nez frames, comprising in combination a central portion of the head, an eye and a nose associated with said central portion, a side portion hinged to said central portion and movable in relation to said central portion by means of adjusting screws, for the purpose of altering the width of the head, and an ear adjustable in position on said side portion.

9. A model fitting head for teaching and carrying out the fitting of spectacle and pince-nez frames, comprising in combination a central portion of the head, an eye and a nose associated with said central portion, a side portion hinged to said head and movable in relation to said central portion by means of adjusting screws, for the purpose of altering the width of the head, an ear adjustable in position on said side portion, separate metallic elements let into said head and provided with distinctively marked apertures, and members on said eye, nose and ear adapted for insertion into said distinctively marked apertures.

In testimony whereof I hereunto affix my signature this 29th day of January, 1931.

GEORG FRIEDRICH KÄPERNICK.